Figure 1:
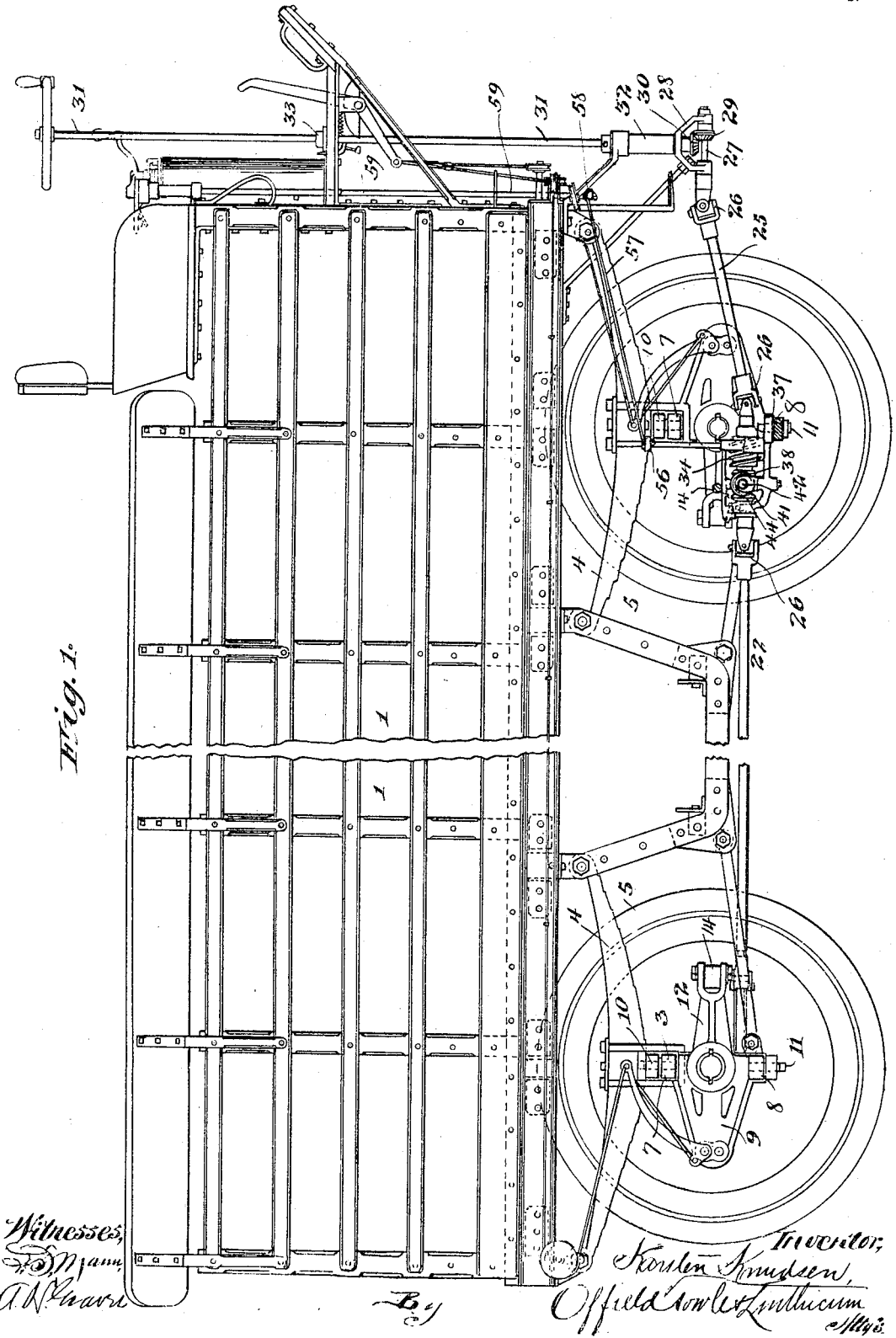

No. 792,599. PATENTED JUNE 20, 1905.
K. KNUDSEN.
STEERING GEAR FOR VEHICLES.
APPLICATION FILED JULY 30, 1904.

7 SHEETS—SHEET 2.

Witnesses,
Inventor,
Karsten Knudsen,
By Offield Towle & Linthicum
Attys.

No. 792,599. PATENTED JUNE 20, 1905.
K. KNUDSEN.
STEERING GEAR FOR VEHICLES.
APPLICATION FILED JULY 30, 1904.
7 SHEETS—SHEET 3.

Witnesses: Karsten Knudsen, Inventor.
By Offield Towle Linthicum, Attys.

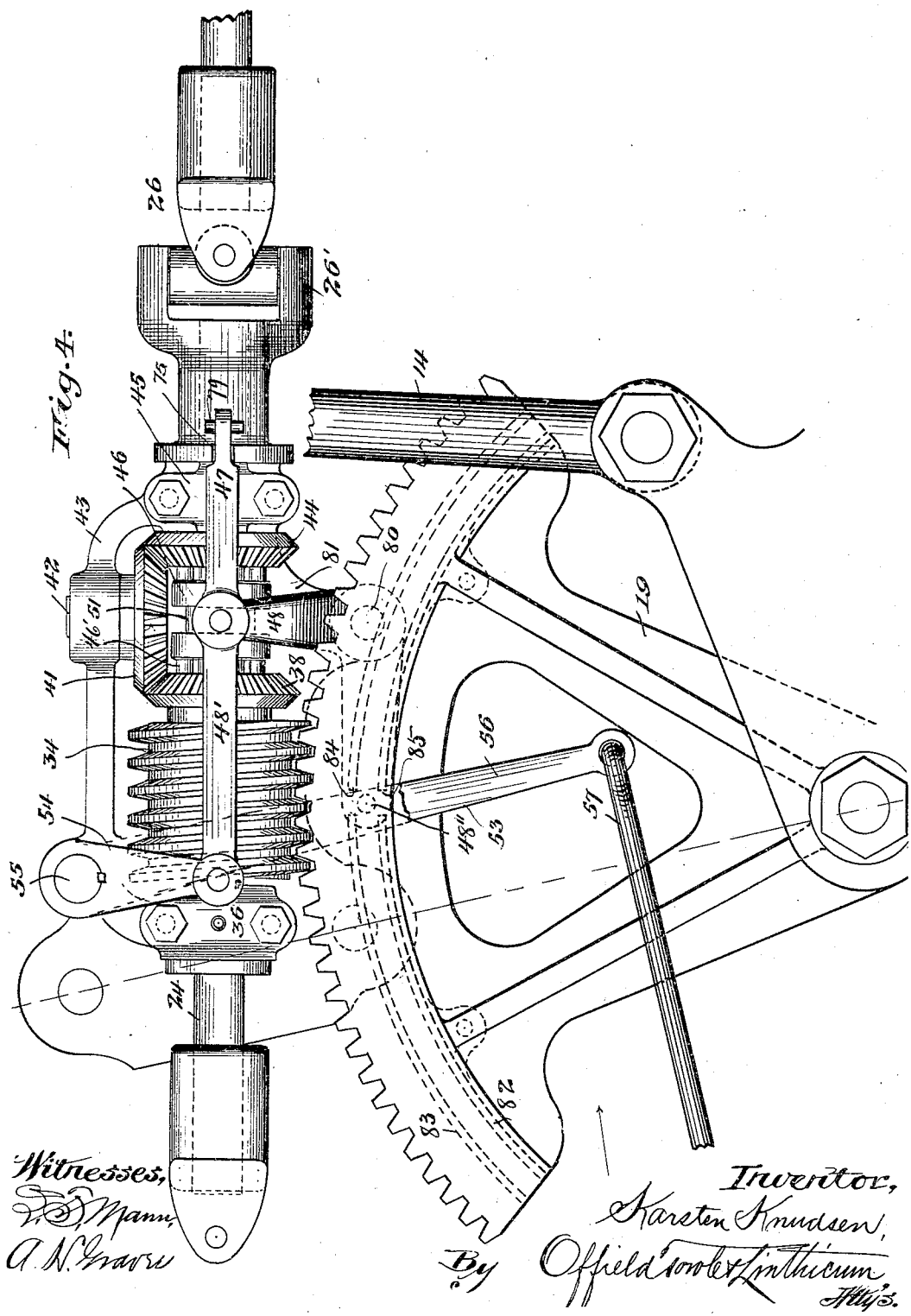

No. 792,599. PATENTED JUNE 20, 1905.
K. KNUDSEN.
STEERING GEAR FOR VEHICLES.
APPLICATION FILED JULY 30, 1904.
7 SHEETS—SHEET 5.
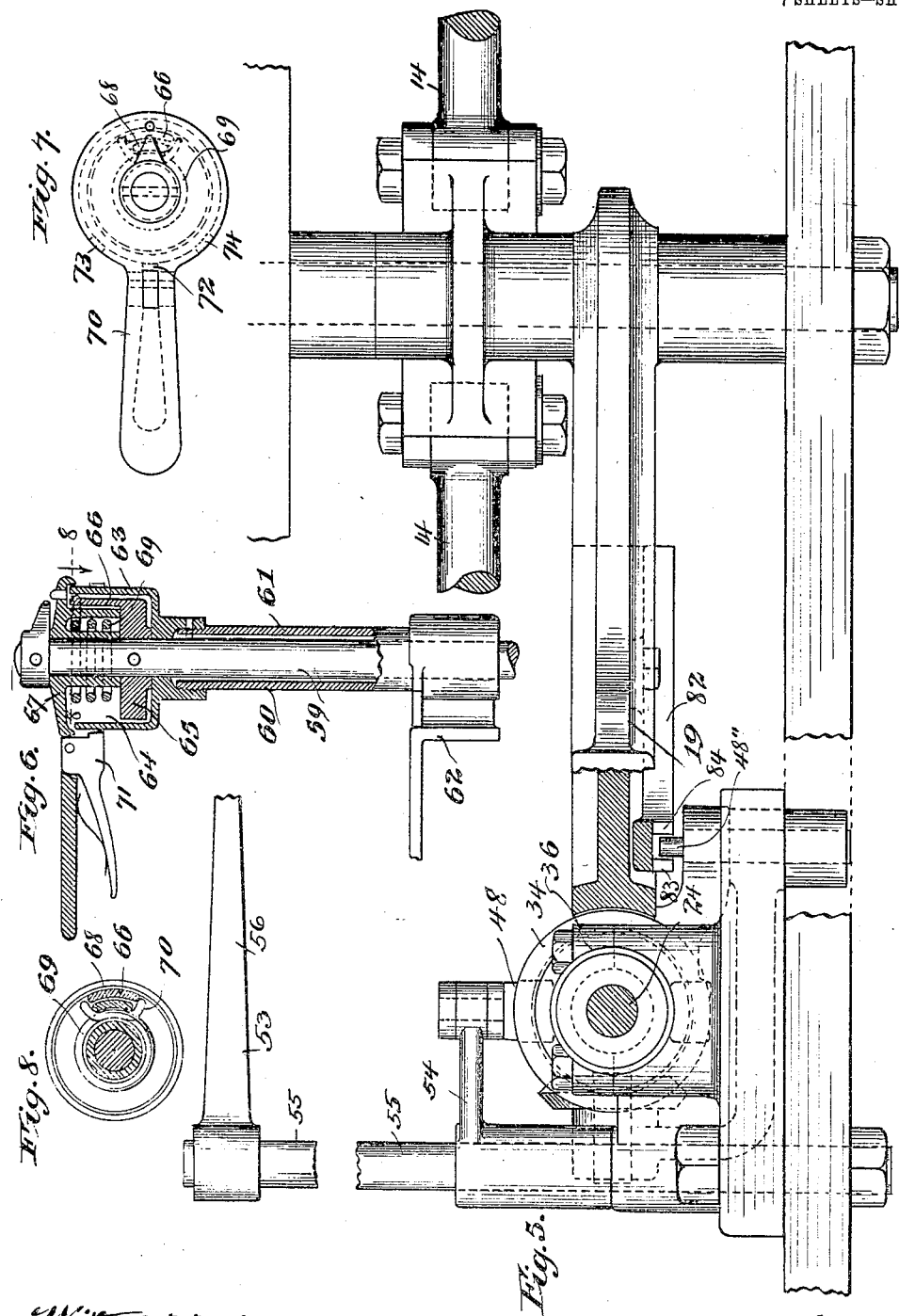

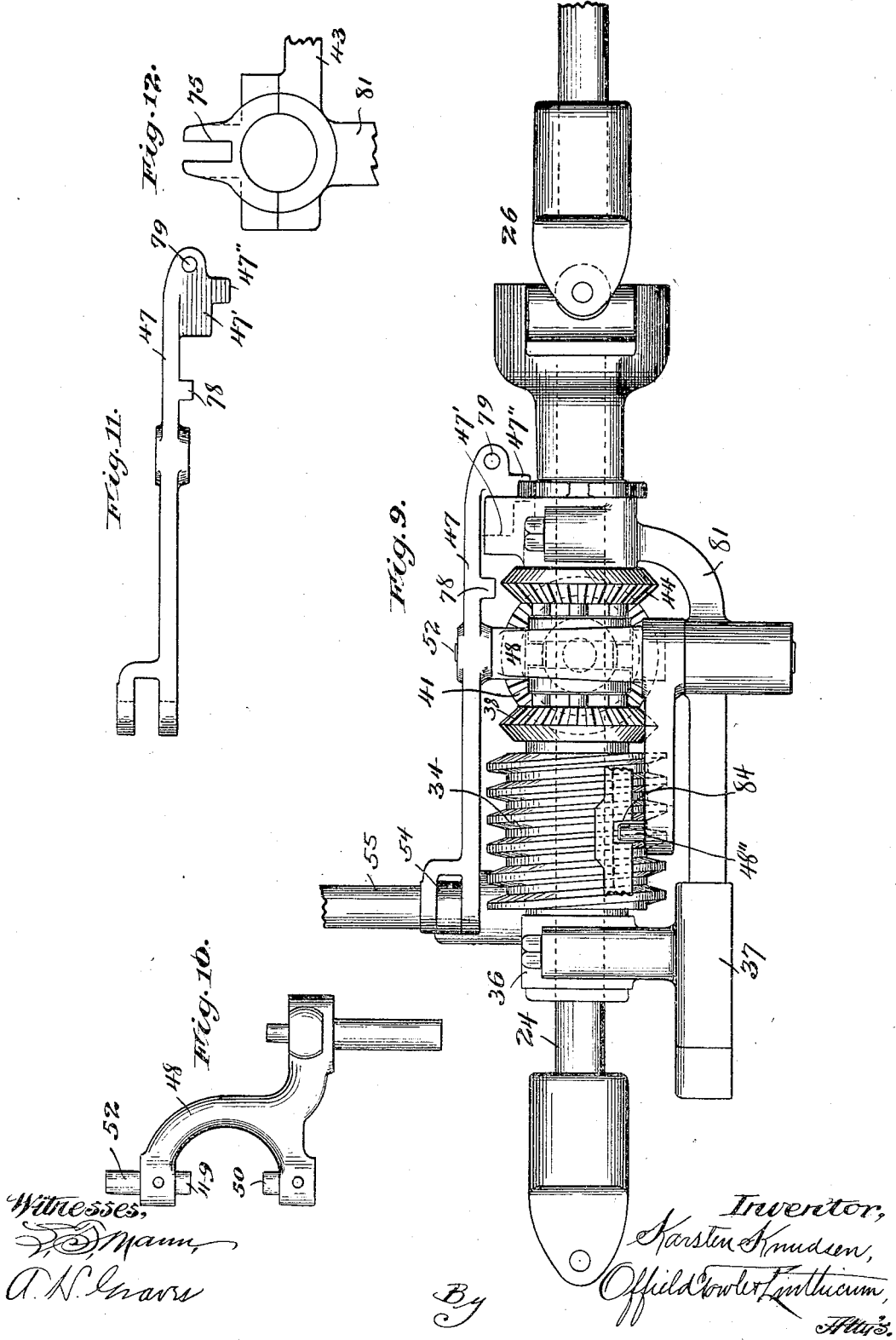

No. 792,599. PATENTED JUNE 20, 1905.
K. KNUDSEN.
STEERING GEAR FOR VEHICLES.
APPLICATION FILED JULY 30, 1904.
7 SHEETS—SHEET 7.
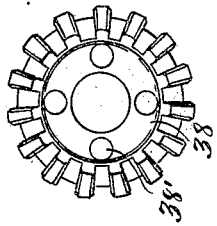
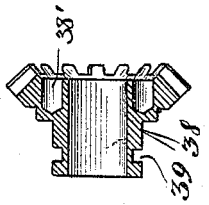
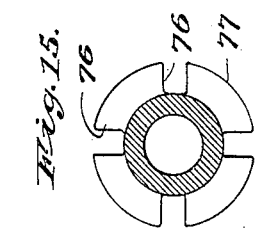
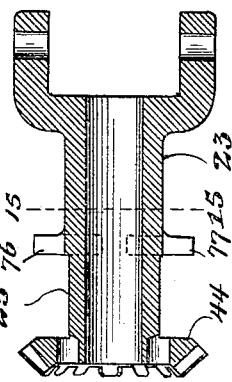
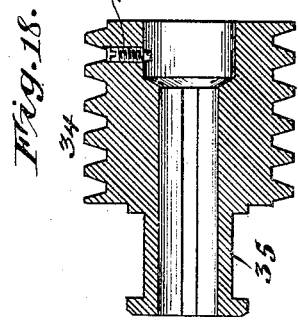
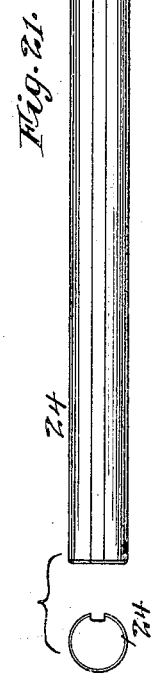
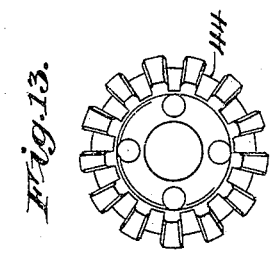
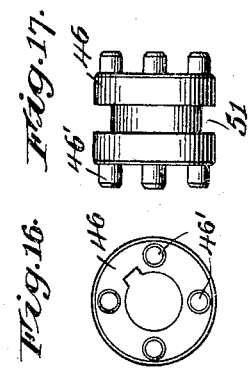
Witnesses,
Inventor,
Karsten Knudsen
By Offield Towle Linthicum
Attys.

No. 792,599. Patented June 20, 1905.

UNITED STATES PATENT OFFICE.

KARSTEN KNUDSEN, OF CHICAGO, ILLINOIS, ASSIGNOR TO HOLSON MOTOR PATENTS COMPANY, LTD., OF GRAND RAPIDS, MICHIGAN, A LIMITED PARTNERSHIP UNDER THE LAWS OF MICHIGAN.

STEERING-GEAR FOR VEHICLES.

SPECIFICATION forming part of Letters Patent No. 792,599, dated June 20, 1905.

Application filed July 30, 1904. Serial No. 218,386.

*To all whom it may concern:*

Be it known that I, KARSTEN KNUDSEN, a citizen of the United States, residing at Chicago, in the county of Cook and State of Illinois, have invented certain new and useful Improvements in Steering-Gear for Vehicles, of which the following is a specification.

This invention relates to improvements in steering-gear for vehicles; and it has for its salient objects to provide a mechanism whereby a variety of steering movements may be accomplished by one and the same mechanism by the simple shifting of a controlling-lever to different positions; to provide a construction in which the control of the wheels is positive in all positions; to provide a construction in which the power for shifting the positions of the wheels is transmitted through a worm and worm-gear mechanism, thereby enabling the operator to accomplish the steering movement without overtaxing his strength; to provide a construction in which the controlling-lever, which accomplishes the shifting from one variety of steering movements to another variety of steering movements, may be made at any time, but, nevertheless, the actual shifting of the mechanism from one driving-train to another driving-train is permitted only at a moment when the wheels are all parallel with each other, thereby preventing the possibility of getting the wheels out of proper relation to each other; to provide a construction in which the shifting of the wheels to accomplish a movement of the vehicle laterally in either direction is possible when either of the three varieties of steering movements are utilized; to provide a system of connections which permits all possible movements of one end or axle of the vehicle relatively to the other without in any wise disturbing or bringing injurious stresses upon the steering mechanism; to provide simple, strong, and durable features of construction for accomplishing the several objects hereinbefore referred to, and in general to provide a simple and improved mechanism of the character referred to.

To the above ends the invention consists in the matters hereinafter described, and more particularly pointed out in the appended claims; and the invention will be readily understood from the following description, reference being had to the accompanying drawings, in which—

Figure 2:
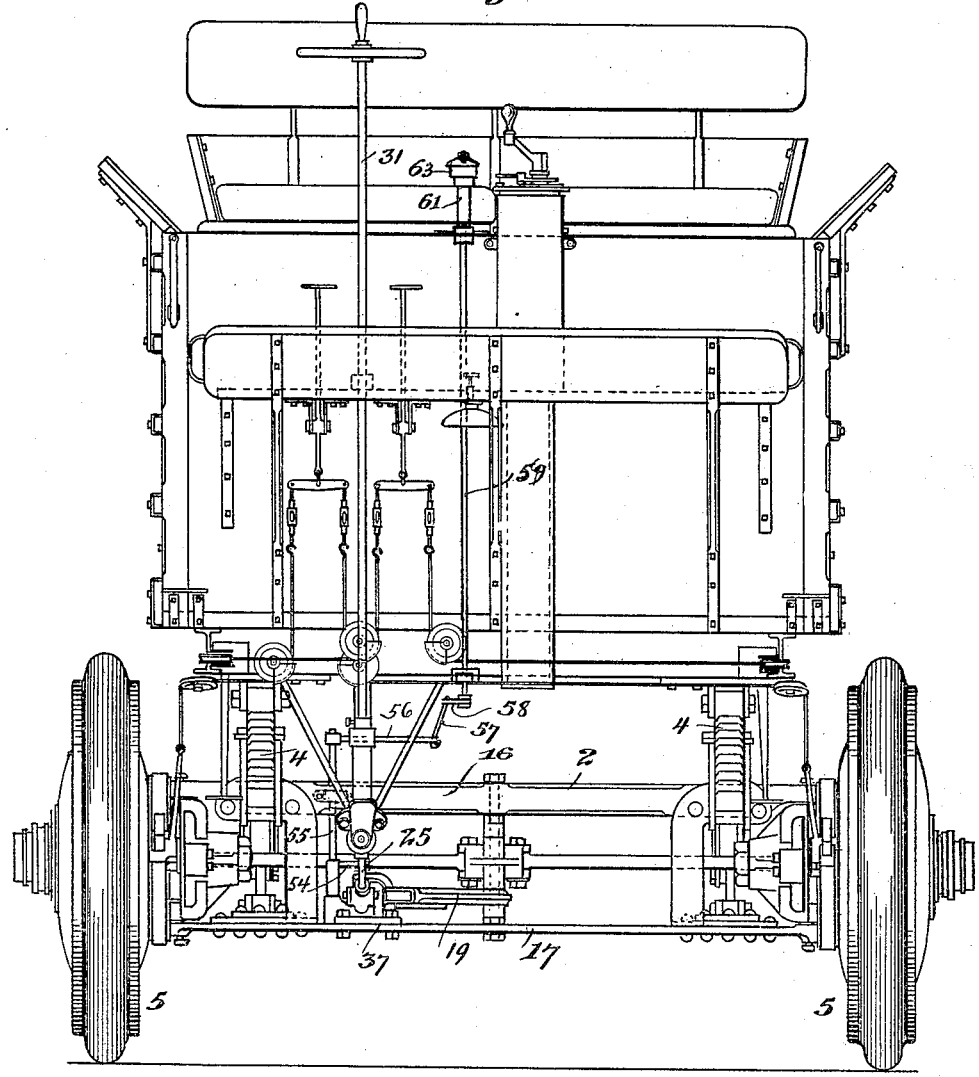
Figure 3:
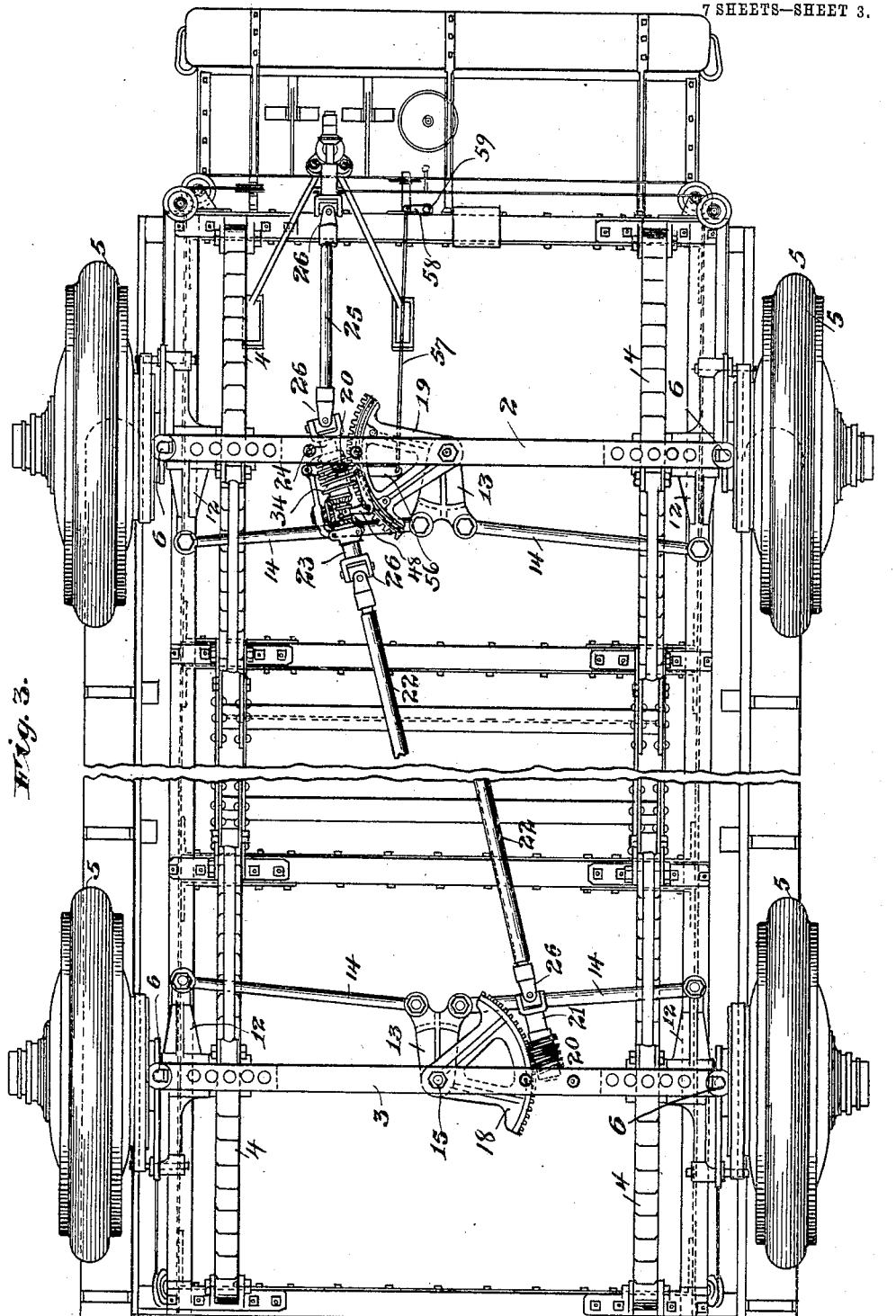

Figure 1 is a side elevation of a motor-truck equipped with my invention, the central portion of the vehicle being broken out to reduce the length of the figure. Fig. 2 is a front end elevation of the vehicle. Fig. 3 is a bottom plan view of the vehicle, the central portion being broken out, as in Fig. 1. Fig. 4 is a top plan view, with parts broken away, of that part of the steering-gear mounted upon the front axle and whereby the shifting from one variety of movements to another is accomplished. Fig. 5 is an end elevation, with parts in section, of the parts shown in Fig. 4. Fig. 6 is a detail, principally in axial section, of the controller-head, whereby the shifting from one variety of steering movements to another is accomplished. Fig. 7 is a plan view of the parts shown in Fig. 6; Fig. 8, a cross-sectional view taken on line 8 8 of Fig. 6 and looking downwardly. Fig. 9 is an edge elevation of the worm-shaft and clutch mechanism shown in Fig. 4, a fragment of the gear-segments being shown in position. Fig. 10 is a detail of one of the shipping-levers; Fig. 11, a detail of a combined shipping and clutch lever; Fig. 12, an end elevation of a guiding-support with which the lever shown in Fig. 11 coöperates. Fig. 13 is a face view of one of the clutch-gears. Fig. 14 is an axial section of the clutch-gear shown in Fig. 13 and the sleeve upon which said gear is mounted. Fig. 15 is a sectional view taken on line 15 15 of Fig. 14 looking in the direction of the arrows. Figs. 16 and 17 are details of the double active clutch. Fig. 18 is an axial section of the worm which coöperates with the clutch mechanism. Figs. 19 and 20 are details of the loosely-mounted clutch-gear of the pair, and Fig. 21 a detail of that section of the worm-shaft which carries the clutch mechanism.

Referring to the drawings, 1 designates as a whole the body of an automobile-truck; 2 and 3, respectively, the front and rear axles thereof, and 4 sets of semi-elliptic springs whereby the truck is united with the running-gear in an obvious manner. The several wheels 5 are united with the respective ends of the axles so as to oscillate upon the vertical axes 6, located at the ends of the axles, each end of each axle being for this purpose provided with a Y-shaped yoke, between the upper and lower arms 7 and 8 of which are pivoted main supporting-castings 9, having upper and lower alined pivot-studs 10 and 11. Each casting 9 is provided with an arm, as 12, extending at right angles to the wheel-journal portion thereof, and the two arms 12 of each pair of wheels are connected with a rocker 13, pivoted to the central portion of the axle by means of rigid links 14, so that the wheels are controlled to move in unison. The rocker members 13 are fast upon the vertical shaft 15, which is journaled in the upper and lower members 16 and 17 of the axle, and upon each shaft 15 is rigidly mounted a gear-segment, as 18 and 19. The gear-segments 18 and 19 are reversely disposed and adapted to coöperate with worm-gear sections mounted upon the worm-shaft, (designated as a whole 20.)

The worm-shaft as a whole is arranged to extend diagonally across the running-gear, so as to intermesh with the two segments 18 and 19, and comprises an end section 22, a clutch-gear section 23, a second worm-gear section 24, and a front end member 25, all of the several sections mentioned being connected with each other by means of universal joints 26. The front end section 25 is connected with a shaft 27, also by means of a universal joint, which shaft is journaled in a suitable Y-shaped bracket or fork 28, suitably supported to depend from the front portion of the truck-body. Upon the shaft 27 and within the fork 28 is mounted a miter-gear 29, which meshes with a corresponding gear 30, mounted upon the lower end of the upright steering-shaft 31, which is journaled in suitable supports 32 and 33, the upper end of the steering-shaft being provided with a hand-wheel located conveniently for access of the operator.

It will be obvious from the foregoing description that rotation of the steering-shaft 31 will be imparted to the worm-shaft members and through the latter to the gear-segments 18 and 19.

Means are provided for rotating the front and rear worm-shaft sections 24 and 21, respectively, together, as though the shaft-sections were integral reversely of each other, so as to move the gear-segments oppositely and also for rotating the front worm-section without movement of the rear worm-section, these several movements being provided for accomplishing various steering movements, as will hereinafter be described. Describing now the mechanism whereby these various movements are effected, and referring more particularly to Figs. 4, &c., 34 designates a worm-gear section, which is splined upon the shaft-section 24, so as to rotate positively with the latter, but permitting endwise movement of the shaft-section 24, so as to provide for the telescoping movement of the shaft incident to the flexing of the front shaft-section relatively thereto as the truck-body rises and falls. In order to confine said worm-gear section accurately in position, it is provided at its forward end with a reduced portion 35, (see Fig. 18,) which is embraced by a split collar 36, carried by a bracket 37, which is in turn mounted upon the main axle member, as best shown in Fig. 2. Adjacent to the rear end of the worm-section 34 and partly recessed therein is mounted a clutch-gear 38, this gear being of the miter type and being provided with an annual recess 39, which is engaged by a set-screw 40, inserted through the body of the worm-gear, and thus confining the clutch-gear in fixed relation to the worm-section while permitting the gear to rotate freely. The gear 38 is arranged to intermesh with a transmission-gear 41, arranged at right angles thereto and journaled upon a stud-shaft 42, carried by a bracket 43. The transmission-gear intermeshes in turn with a second clutch-gear 44, which is rigidly mounted upon the shaft-section 23, (see detail, Fig. 14,) the bracket member 43 being provided with a split collar portion 45, which embraces a reduced journal portion 23' of the shaft-section 23, and thus serves to confine the clutch-gear 44 in proper relation to the transmission-gear 41, as well as affording a support for the bracket 43. Between the two clutch-gears is arranged a pin-clutch member 46, which is splined upon the shaft-section 24 and is adapted to be shifted into locked engagement with either of the clutch-gears or to be held in an intermediate position in which it is free from engagement with either. In order to control the position of the clutch member, a shifting bar 47 is provided, which is arranged to overlie the clutch member and extend longitudinally of the worm-shaft, said shifting bar being connected with the clutch member through the medium of an elbow-lever designated 48. (See detail, Fig. 10.) The lever 48 is provided at its clutch-engaging end with a fork carrying upper and lower studs 49 and 50, which engage a groove 51 in the periphery of the clutch member, the upper fork member being provided at its upper side with a pin projection 52, which engages a corresponding bearing-aperture in the shifting bar 47. In order to impart endwise movement to the shifting bar, the latter is connected with one arm 54 of a double-armed lever 53, pivotally supported upon a stud 55, carried by the bracket 43. The longer arm 56 of the lever 53 extends inwardly toward the center of the truck and is connected at its swinging end with a link 57, (see Fig. 3,) which extends thence forwardly to and is connected with a crank-arm 58, mounted upon the lower end of a controller-shaft 59, which extends upwardly and terminates within a controller-head designated as a whole 60. (See detail, Fig. 6.) The controller-head comprises a tubular outer casing 61, rigidly supported, by means of a suitable bracket 62, upon the front of the truck and provided at its upper end with an enlarged portion 63, forming an internal cylindric chamber 64. Upon the controller-shaft 59 within the chamber 64 is keyed a collar 65, provided at its front side with an upstanding lug 66. (See detail, Fig. 8.) Upon the controller-shaft immediately above the collar 65 is loosely journaled an actuating-head 67, provided at its front side with a downwardly-depending lug 68, which is located radially inside of the lug 66. The lugs 66 and 68 are normally centered or held in radial register with each other by means of a coiled spring 69, encircling the central portion of the controller-head 67 and having both ends outturned, as indicated at 70, to embrace the opposite sides of the lug 66. With the parts constructed and arranged as described it will be evident that whenever the controller-head is positively rotated in either direction relatively to the collar 65' the spring 69 will be tensioned and will tend to restore said parts to their normal or centered position. The controller-head is provided at one side with an extension 70, constituting the handle, and upon the under side of this handle is pivoted a spring-pressed latch 71, which is adapted to engage either one of three notches 72, 73, and 74, formed in the periphery of the casing 63. (See detail, Fig. 7.) It will be understood that the controller-head is thus yieldingly connected with the controller-shaft 59, so that the controller-head may be set in any of the three positions described independently of the movement of the said shaft.

Referring again to Figs. 4, &c., the shifting bar 47 is provided at its rear end with a guide-web 47', which engages a notch or guideway 75, formed in the upper side of the collar 45, and beyond this guide-web it is also provided with a projection 47'', constituting a dog adapted to engage either one of a series of notches 76, formed in an enlargement 77 of the coupling member 26'. In order to positively limit the endwise movement of the shifting bar in each direction, it is provided with stop projections 78 and 79, respectively, the former being arranged upon the under side of the bar and adapted to engage the collar 45 in the rearward shifting of the bar and the latter being made in the form of a through-pin adapted to engage the annular enlargement 77 in the opposite movement of the bar.

The elbow-lever 48, hereinbefore referred to, is pivoted at its angle, as indicated at 80, upon a bracket member 81, which underlies the clutch mechanism, (see detail, Fig. 9,) and the longer and forwardly-extending arm 48' of said lever is provided with a cam-stud 48'', which is adapted to engage cam projections formed or mounted upon the under side of the gear-segment 19. The cam projections referred to comprise two ribs 82 and 83, respectively, arranged parallel with each other and curved concentrically with the pivotal axis of the gear-segment, said ribs being spaced apart a distance sufficient to accommodate the diameter of the cam-stud 48'' and each being interrupted midway of its length, as indicated at 84 and 85, to provide transverse passage-ways through which the cam-stud may pass laterally—that is to say, the cam-stud is adapted to operatively engage either the inside of the inner rib 82 or approximate sides of the two ribs when between the latter or the outside of the outer rib 83, these three positions of the cam-studs corresponding to the three positions of the clutch member 46—that is to say, when the clutch member is shifted forwardly into full engagement with the loose gear 38 the cam-stud 48'' will engage the inner face of the rib 82. When the clutch member is shifted to its intermediate position, the cam-stud will engage between the two ribs, and when the clutch member is shifted to its rearmost limit the cam-stud will engage the outer face of the rib 83. It will be understood that the clutch-gears 38 and 44 are provided in their proximate faces with pin-receiving recesses 38', adapted to receive the corresponding pins 46' of the clutch member.

The two worm-sections of the worm-shaft have their threads pitched in the same direction, and it follows that by reason of the reversed arrangement of the gear-segments when both worm-sections are rotated in the same direction the gear-segments and connected rocker members 13 will be oscillated in opposite directions.

The operation of the steering-gear constructed and arranged as described is probably entirely obvious from the foregoing description, but may be briefly recapitulated as follows: Assuming that the operator wishes to steer by means of the front pair of wheels only, the controller will be set in the position shown in the drawings—i. e., the controller-head will be set in its intermediate central position, and accordingly the clutch member 46 will be in its intermediate position, as shown in Fig. 4. In this position of the parts rotation of the steering-shaft by means of the hand-wheel will rotate the front portion of the worm-shaft in one direction or the other and with it the front worm-section 34. Inasmuch as the gear 38 is loosely connected with the worm-section 34 and the clutch member is at this time disengaged from said gear 38, it will be obvious that no rotation will be imparted to the rear worm-section, and accordingly the steering will be accomplished through the front gear-segment only, the two front wheels moving together and maintaining their parallelism at all times. If, however, the operator wishes to cause the truck to move bodily in a lateral or oblique direction—as, for example, in approaching or receding from a curb, he shifts the controller-handle in the direction to carry the shifting bar to its forward limit of movement, thus tensioning the spring 69, so that it will tend to rotate the shaft 59. The shaft 59 will not, however, be free to rotate until the front wheels reach a position exactly parallel or in alinement with the rear wheels, or, in other words, until the front gear-segment 19 is centered with reference to the axle, whereupon the tension of the spring 69, acting through the controller-shaft and connecting parts, will effect the shifting of the elbow-lever 48 and with it the movement of the clutch member into engagement with the loose gear 38. The loose gear being thus made fast with the clutch and the latter being splined on its shaft-section, driving movement is imparted to the transmission-gear 41 and through the latter to the gear 44, which is fast on the rear worm-shaft section. The gear 44, and with it the shaft-sections connected thereto, will, however, be rotated in a direction the reverse of that of the front worm-section, so that the rear gear-segment 18 will be oscillated in a direction away from the front gear-segment, and this will result in imparting to the rear pair of wheels the same movement as is imparted to the front pair of wheels, or, in other words, will maintain all of the wheels in parallel relation. If, however, the operator wishes to make a short turn with the truck, this will be facilitated by manipulating the front and rear pairs of wheels in reverse directions. Accordingly he shifts the controller over to its opposite limit of movement, thus causing the clutch member to shift into engagement with the rear clutch-gear 44 as soon as the segment reaches a position permitting this crossing-over movement. Since the gear 44 is non-rotatably connected to the rear worm-shaft sections and the clutch member is splined upon the forward worm-shaft section, it follows that the worm-shaft as a whole will be rotated as though it were an integral structure. This will obviously cause the front and rear pairs of wheels to move in opposite directions or into angular relation to each other, thus both aiding in imparting to the truck a rapid turning movement. It will be obvious, of course, that in either of the three positions of adjustment of the steering mechanism the truck-wheels can be turned either to the right or to the left, this movement being accomplished by simply rotating the steering-shaft one way or the other. It is also to be noted that when the clutch member is in its intermediate position, or in that position in which the steering is accomplished solely by means of the front pair of wheels, the rear wheels are nevertheless rigidly locked against departure from a position at right angles to the axle. This is accomplished by means of the shifting-lever 47 engaging with its dog-tooth or projection 47″ in the notch 76 in the periphery of the annular collar or enlargement 77. Inasmuch as the shifting-lever is supported by the engagement of its guide-web 47′ with the guideway in the collar 45, it follows that the interengagement of the parts locks the rear gear-shaft sections positively against movement.

From the foregoing description it will be seen that I accomplish the several stated objects of the invention and provide a mechanism which is extremely simple, strong, positive, and convenient in operation.

While I have herein shown and described a preferred embodiment of the invention, yet it will be obvious that the invention is not in any sense limited to the details of construction shown and described nor to the particular application illustrated. On the contrary, the invention may be otherwise embodied without in any sense departing therefrom.

I claim as my invention—

1. In combination with a four-wheeled vehicle provided with wheels mounted to pivot on substantially vertical axes severally located laterally outside of the median longitudinal line of the vehicle, a steering mechanism comprising a rocker member mounted upon the vehicle-frame between each pair of wheels, operative connections between each rocker member and the corresponding pair of wheels whereby the latter are moved in unison with the rocker, a segment pivoted upon the main frame adjacent to, and operatively connected with, each rocker, said segments being reversely disposed relatively to each other, an operating-shaft rotatably supported and arranged to extend diagonally from one segment to the other and operatively connected with each, and means for rotating said shaft in both directions.

2. In combination with a four-wheeled vehicle provided with wheels mounted to pivot on substantially vertical axes severally located laterally outside of the median longitudinal line of the vehicle, a steering mechanism comprising a rocker member mounted upon the vehicle-frame between each pair of wheels, operative connections between each rocker member and the corresponding pair of wheels whereby the latter are moved in unison with the rocker, a worm-gear segment pivoted upon the main frame adjacent to, and operatively connected with, each rocker, said worm-gear segments being reversely disposed relatively to each other, an operating worm-shaft rotatably supported and arranged to extend diagonally from one worm-gear segment to the other and operatively connected with each, and means for rotating said worm-shaft in both directions.

3. In combination with a four-wheeled vehicle provided with wheels mounted to pivot on substantially vertical axes severally located adjacent to the ends of the vehicle-axles, a steering mechanism comprising a rocker member mounted upon the central part of each main axle, link-and-crank connections between each rocker member and the corresponding pair of vehicle-wheels, a worm-gear segment rigid with each rocker member, said worm-gear segments being reversely disposed relatively to each other, a worm-shaft arranged to extend diagonally from one segment to the other and provided with worm-sections of the same direction of pitch and respectively engaged with the two worm-gear segments, and means for rotating said worm-shaft in both directions to operate the steering mechanism.

4. In combination with a four-wheeled vehicle provided with wheels mounted to pivot on substantially vertical axes severally located adjacent to the ends of the vehicle-axles, a steering mechanism comprising a rocker member mounted upon the central part of each main axle, link-and-crank connections between each rocker member and the corresponding pair of vehicle-wheels, a worm-gear segment rigid with each rocker member, said worm-gear segments being reversely disposed relatively to each other, a worm-shaft arranged to extend diagonally from one segment to the other and provided with worm-sections respectively engaged with the two worm-gear segments, means for rotating said worm-shaft in both directions to operate the steering mechanism, and means for effecting a reversal of rotation of the part of said worm-shaft carrying one worm-section from that carrying the other worm-section.

5. In combination with a four-wheeled vehicle provided with wheels mounted to pivot on substantially vertical axes severally located adjacent to the ends of the vehicle-axles, a steering mechanism comprising a rocker member mounted upon the central part of each main axle, link-and-crank connections between each rocker member and the corresponding pair of vehicle-wheels, an actuating member operatively connected with each rocker member, said actuating members being reversely disposed relatively to each other, an operating-shaft extending diagonally between, and operatively connected with each of said actuating members, and means for actuating said operating-shaft.

6. In combination with a four-wheeled vehicle provided with wheels mounted to pivot on substantially vertical axes severally located adjacent to the ends of the vehicle-axles, a steering mechanism comprising a rocker member mounted upon the central part of each main axle, link-and-crank connections between each rocker member and the corresponding pair of vehicle-wheels, a worm-gear segment operatively connected with each rocker member, said segments being reversely disposed relatively to each other, a worm-shaft extending between, and operatively connected with, the two segments, a reversing-clutch mechanism interposed between the segment-engaging portions of the worm-shaft, and constituting a driving connection between the two parts of the worm-shaft, means for rotating said worm-shaft in both directions, and means for shifting said reversing-clutch mechanism.

7. In combination with a four-wheeled vehicle provided with wheels mounted to pivot on substantially vertical axes severally located adjacent to the ends of the vehicle-axles, a steering mechanism comprising a segment pivotally mounted upon each axle and operatively connected with the respective wheels thereof, said segments being reversely disposed relatively to each other, a gear-shaft arranged to extend diagonally between said segments and provided with gear-sections operatively connected with the respective segments, a reversing-clutch mechanism controlling the two parts of said gear-shaft carrying said gear-sections, means for rotating said gear-shaft in both directions, and means for actuating said reversing-clutch mechanism independently of the rotation of the shaft.

8. In combination with a four-wheeled vehicle provided with wheels mounted to pivot on substantially vertical axes severally located adjacent to the ends of the vehicle-axles, a steering mechanism comprising a segment pivotally mounted upon each axle and operatively connected with the respective wheels thereof, said segments being reversely disposed relatively to each other, a gear-shaft arranged to extend diagonally between said segments and provided with gear-sections operatively connected with the respective segments, a reversing-clutch mechanism having a clutch member shiftable into three positions, viz: a direct driving position, a reversed driving position and an intermediate idle position, arranged to control the two parts of said gear-shaft carrying the respective gear-sections, means for rotating said gear-shaft in both directions, and means for actuating said reversing-clutch to set it in either of its three positions of adjustment.

9. In a steering mechanism, a sectional main shaft, comprising drive and driven shaft sections, steering connections between said main shaft and the vehicle-wheels, and a clutch mechanism for controlling the rotation of one section of said shaft relatively to another, comprising a bevel-gear rotatably mounted upon one shaft-section, a second bevel-gear fixedly mounted upon the contiguous shaft-section, an intermediate bevel-gear meshing with both of the shaft-section gears, a shiftable clutch member slidably mounted between the bevel-gears of the shaft-sections and adapted for positive engagement with either of said gears alternatively, means connecting said clutch member to rotate positively with the driving-shaft section, and means for shifting said clutch member, for the purpose set forth.

10. In a steering mechanism, a sectional main shaft comprising drive and driven shaft sections, steering connections between said main shaft and the several vehicle-wheels and a clutch mechanism constituting a driving connection between said shaft-sections, comprising a bevel-gear rotatably mounted upon the drive-section, a bevel-gear non-rotatably mounted upon the contiguous driven section, an intermediate bevel-gear meshing with the two shaft-section gears, a clutch member mounted to reciprocate between the two shaft-section gears and adapted to positively interlock with either of said gears and adapted also to assume an intermediate inactive position, means for moving and holding said clutch member in either of its three positions of adjustment, and a coöperating member arranged to lock the driven-shaft section positively against rotation while the clutch member is in its intermediate inactive position.

11. In a steering mechanism, a sectional main shaft comprising drive and driven shaft sections, steering connections between said main shaft and the several vehicle-wheels and a clutch mechanism constituting a driving connection between said shaft-sections, comprising a bevel-gear rotatably mounted upon the drive-section, a bevel-gear non-rotatably mounted upon the contiguous driven sections, an intermediate bevel-gear meshing with the two shaft-section gears, a clutch member mounted to reciprocate between the two shaft-section gears and adapted to positively interlock with either of said gears and adapted also to assume an intermediate inactive position, means for moving and holding said clutch member in either of its three positions of adjustment, and a coöperating member arranged to lock the driven-shaft section positively against rotation while the clutch member is in its intermediate inactive position, comprising a recessed member rigidly mounted upon the driven-shaft section, and a shifting bar provided with a dogging projection adapted to said recess, said shifting bar being connected to move with the clutch member.

12. In a steering mechanism, a sectional main shaft comprising drive and driven shaft sections, steering connections between said main shaft and the several vehicle-wheels, and a clutch mechanism constituting a driving connection between said shaft-sections, comprising a bevel-gear rotatably mounted upon the drive-section, a bevel-gear non-rotatably mounted upon the contiguous driven sections, an intermediate bevel-gear meshing with the two shaft-section gears, a clutch member mounted to reciprocate between the two shaft-section gears and adapted to positively interlock with either of said gears and adapted also to assume an intermediate inactive position, a bracket having one end mounted upon, and embracing the driven-shaft section adjacent to the bevel-gear thereon and provided in its embracing member with a guideway, the body of said bracket being rigidly secured to the main frame of the vehicle, a yoke connected with said clutch member, a shifting bar connected with said yoke at a point intermediate its length, engaging the guideway of the bracket adjacent to one end and provided with a dogging projection adapted to engage a locking-recess formed in the driven-shaft section, and a cranked rock-shaft operatively connected with said shifting bar, substantially as described.

13. In combination with a four-wheeled vehicle provided with wheels mounted to pivot on substantially vertical axes, severally located laterally outside of the longitudinal line of the vehicle, a steering mechanism comprising worm-gear segments pivotally mounted upon the central portions of the respective main axles and oppositely disposed relatively to each other, operative connections between said segments and the respective pairs of wheels whereby the latter are positively moved in unison with the segments, a worm-shaft extending diagonally between, and operatively engaging each of said segments, and flexible shaft connections connected with said worm-shaft extending thence forwardly to the front of the vehicle, and thence vertically upward to a point accessible to the operator.

14. In combination with a four-wheeled vehicle, a steering mechanism comprising a sectional main shaft comprising drive and driven shaft sections, steering connections between said main shaft and the vehicle-wheels, a clutch mechanism for controlling the rotation of one section of said shaft relatively to another, mechanism for shifting said clutch mechanism, and means for positively locking the clutch mechanism against shifting movement except when the wheels are all substantially parallel with each other.

15. In combination with a four-wheeled vehicle, a steering mechanism comprising a sectional main shaft having drive and driven shaft sections, rocking segments operatively connected with said respective shaft-sections, operative connections between said rocking segments and the respective pairs of front and rear wheels, a clutch mechanism forming a driving connection between the drive and driven shaft sections, mechanism for shifting the main clutch member of said clutch mechanism, and means for controlling the actuation of said clutch member comprising guideways formed upon a part moving with the gear-segment adjacent to the clutch mechanism, a controlling-arm operatively connected with said clutch and engaging said ways, said ways being provided with a crossover-passage at a point corresponding to the point of engagement of the controlling-arm therewith when the segment is in central position or the wheels of the vehicle parallel, and yieldable connections for actuating said controlling-arm whereby the clutch member may be set for shifting, regardless of the position of the steering mechanism and again shift only when the wheels are parallel.

16. In combination with a four-wheeled vehicle, a steering mechanism comprising a sectional main shaft having drive and driven shaft sections, rocking segments operatively connected with said respective shaft-sections, operative connections between said rocking segments and the respective pairs of front and rear wheels, a clutch mechanism forming a driving connection between the drive and driven shaft sections, mechanism for shifting the main clutch member of said clutch mechanism, and means for controlling the actuation of said clutch member comprising guideways formed upon a part moving with the gear-segment adjacent to the clutch mechanism, a controlling-arm operatively connected with said clutch and engaging said ways, said ways being provided with a crossover-passage at a point corresponding to the point of engagement of the controlling-arm therewith when the segment is in central position or the wheels of the vehicle parallel, yieldable connections for actuating said controlling-arm whereby the clutch member may be set for shifting, regardless of the position of the steering mechanism and again shift only when the wheels are parallel, and means coöperating with said clutch mechanism to automatically lock the driven worm-shaft section against rotary movement when the clutch is moved into its intermediate position.

17. In combination with a four-wheeled vehicle, a steering mechanism comprising a sectional main shaft having drive and driven shaft sections, worm-sections upon said main shaft, worm-gear segments mounted upon the respective axles and having operative engagement with the respective worm-sections, operative connections between said worm-gear segments and the respective pairs of wheels, a clutch mechanism forming a driving connection between the drive and driven worm-shaft sections and located adjacent to the front-axle worm-gear segment, mechanism for moving the shiftable member of said clutch mechanism and coöperative mechanism controlling the shifting of the clutch member comprising a bell-crank lever having one arm operatively engaging the shiftable clutch member, a pair of parallel ribs upon the adjacent gear-segment, curved concentrically with the pivotal axis of the latter, a cam-stud upon the other arm of said bell-crank lever operatively engaging said ribs, said ribs being each provided with a transverse crossover-opening at a point registering with said engaging stud when the gear-segment is in its central position, a rock-shaft operatively connected with said bell-crank lever, a handle for oscillating said rock-shaft, and spring connections between said handle and rock-shaft, for the purpose set forth.

18. In combination with a four-wheeled vehicle, a steering mechanism comprising a sectional main shaft having drive and driven shaft sections, worm-sections upon said main shaft, worm-gear segments mounted upon the respective axles and having operative engagement with the respective worm-sections, operative connections between said worm-gear segments and the respective pairs of wheels, a clutch mechanism forming a driving connection between the drive and driven worm-shaft sections and located adjacent to the front-axle worm-gear segment, mechanism for moving the shiftable member of said clutch mechanism and coöperative mechanism controlling the shifting of the clutch member comprising a bell-crank lever having one arm operatively engaging the shiftable clutch member, a pair of parallel ribs upon the adjacent gear-segment, curved concentrically with the pivotal axis of the latter, a cam-stud upon the other arm of said bell-crank lever operatively engaging said ribs, said ribs being each provided with a transverse crossover-opening at a point registering with said engaging stud when the gear-segment is in its central position, a rock-shaft arranged to extend upwardly to a point convenient of access to the operator and operatively connected with said bell-crank, a handle rotatably mounted upon said rock-shaft, a double-acting spring connection between said handle and rock-shaft, and a latch for locking the handle in either of a plurality of angularly-adjustable positions.

19. In combination with a vehicle, a steering mechanism comprising worm-gear segments mounted upon the front and rear main axles respectively a sectional worm-shaft extending between and operatively engaging both of said worm-segments, a reversing-clutch mechanism operatively connecting the sections of said worm-shaft, mechanism for shifting said clutch mechanism, and mechanism for rotating said worm-shaft to effect the steering of the vehicle.

KARSTEN KNUDSEN.

Witnesses:
FREDERICK C. GOODWIN,
WILLIAM R. LITZENBERG.